United States Patent

Weinberg

[15] 3,656,011

[45] Apr. 11, 1972

[54] CHARGE COUPLED DEVICE

[72] Inventor: Zeev Abraham Weinberg, Princeton, N.J.

[73] Assignee: RCA Corporation

[22] Filed: Feb. 2, 1971

[21] Appl. No.: 111,876

[52] U.S. Cl. ...........................307/304, 307/221, 317/235 G

[51] Int. Cl. ...........................H01l 11/14

[58] Field of Search...........................328/37; 307/220–226, 304; 317/235

[56] References Cited

UNITED STATES PATENTS 3,174,106 3/1965 Urban...........................328/37

OTHER PUBLICATIONS

Electronics, " New MOS Technique Points Way to Junctionless Devices" by Altman, May 11, 1970, pages 112– 118

IEEE Journal of Solid State Circuits, " Bucket-Brigade Electronics" by Sangster, June 1969, pages 131– 136

*Primary Examiner*—Jerry D. Craig
*Attorney*—H. Christoffersen

[57] ABSTRACT

A shift register using charge coupled device techniques wherein three-phase operation is converted to one-phase operation to provide faster operation thereof.

8 Claims, 4 Drawing Figures

INVENTOR.
Zeev A. Weinberg
BY J. Donald Weber
ATTORNEY

Patented April 11, 1972 3,656,011

3 Sheets-Sheet 2

INVENTOR.
Zeev A. Weinberg
BY
J. Donald Weber Jr.
ATTORNEY

INVENTOR.
Zeev A. Weinberg
BY
G. Donald Weber Jr.
ATTORNEY

CHARGE COUPLED DEVICE

CROSS-REFERENCE AND BACKGROUND

In the Bell System Technical Journal of Apr. 1970 at pages 587 et. seq., W. S. Boyle and G. E. Smith discuss so-called charge coupled semiconductor devices (CCD). These devices store charge in potential wells created at the surface of a semiconductor and selectively move the charge (i.e., information) over the surface of the semiconductor by moving the potential minima or wells.

The work discussed in the paper noted supra shows that charge coupled devices are possible and the operability thereof has been demonstrated. The speed of operation of devices using these techniques is a function of the sizes of the structures as well as the speed of the input and output operations. Consequently, it is desirable to provide a circuit which permits increased speed of operation of this type of device. To effect the increased speed, a higher information transfer rate than would normally be permitted by the clock signal is required. In this arrangement, the transfer rate is limited only by the CCD switching, not by the circuit and control operation.

SUMMARY OF THE INVENTION

This invention relates to charge coupled devices and, more particularly, to shift registers using charge coupled techniques. Essentially, the shift register described herein uses a three-phase clock signal. In order to provide faster operation, the three-phase system is converted into a one-phase system. This is accomplished by having common input and output terminals connected to a plurality of parallel registers. The three-phase clock signal is supplied to each register separately, and in staggered time relations, so that the registers operate at different phase relations.

DESCRIPTION OF A PREFERRED EMBODIMENT

Figure 1:
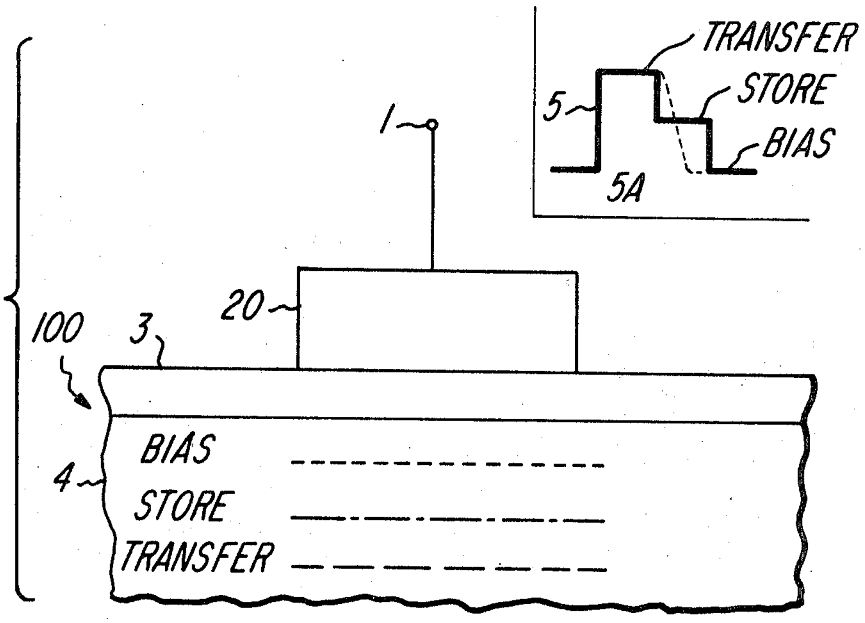
FIG. 1 is a schematic representation of a single gate of a charge coupled device.

In this description, similar components are designated by similar reference numerals.

Referring now to FIG. 1, a single gate of a charge coupled device 100 is shown. Clock terminal 1 is supplied with a clock pulse 5 or 5A. Clock signal 5 (shown in solid line) has three separate levels or amplitudes. These levels are designated as BIAS, STORE and TRANSFER. The clock signals also may have the shape suggested by dashed line 5A.

The input signal is applied to electrode 20 which is typically a conductor. Insulating layer 3 is typically Si $O_2$, while semiconductor body 4 is typically Si. Electrode 20, insulating layer 3 and semiconductor body 4 are arranged in layers, sandwich-like, with the insulating layer intermediate the other elements. Specific device configurations are not included in this discussion. The application of a clock signal to clock terminal 1 has the effect of producing a type of MOS capacitor-like structure. (For positive-going clock signals, P-type silicon is assumed.) That is, depending upon the level of the clock signal supplied, a corresponding potential well is produced in the semiconductor material under the electrode. For example, the application of a clock signal of the BIAS level produces a potential well in body 4 of the BIAS depth. Similarly, a clock signal of the TRANSFER level produces a potential well of the TRANSFER depth. Furthermore, a STORE clock signal level produces a STORE depth potential well.

The significance of the respective potential well configurations is described hereinafter. However, it should be understood that injected charge, representing the information, is selectively stored in the potential wells. Moreover, stored charge can only be transferred to a potential well of greater depth than the potential well in which charge is stored. Typically, charge is injected into a potential well in conjunction with a TRANSFER level clock signal and stored in conjunction with a STORE level clock signal. If then, the clock signal is arranged so that a BIAS signal always succeeds a TRANSFER signal, charge transfer in one direction is assured. That is, since a BIAS signal produces a potential well of lesser depth than a TRANSFER signal, charge cannot be transferred into the potential well produced by the BIAS signal.

Figure 2:
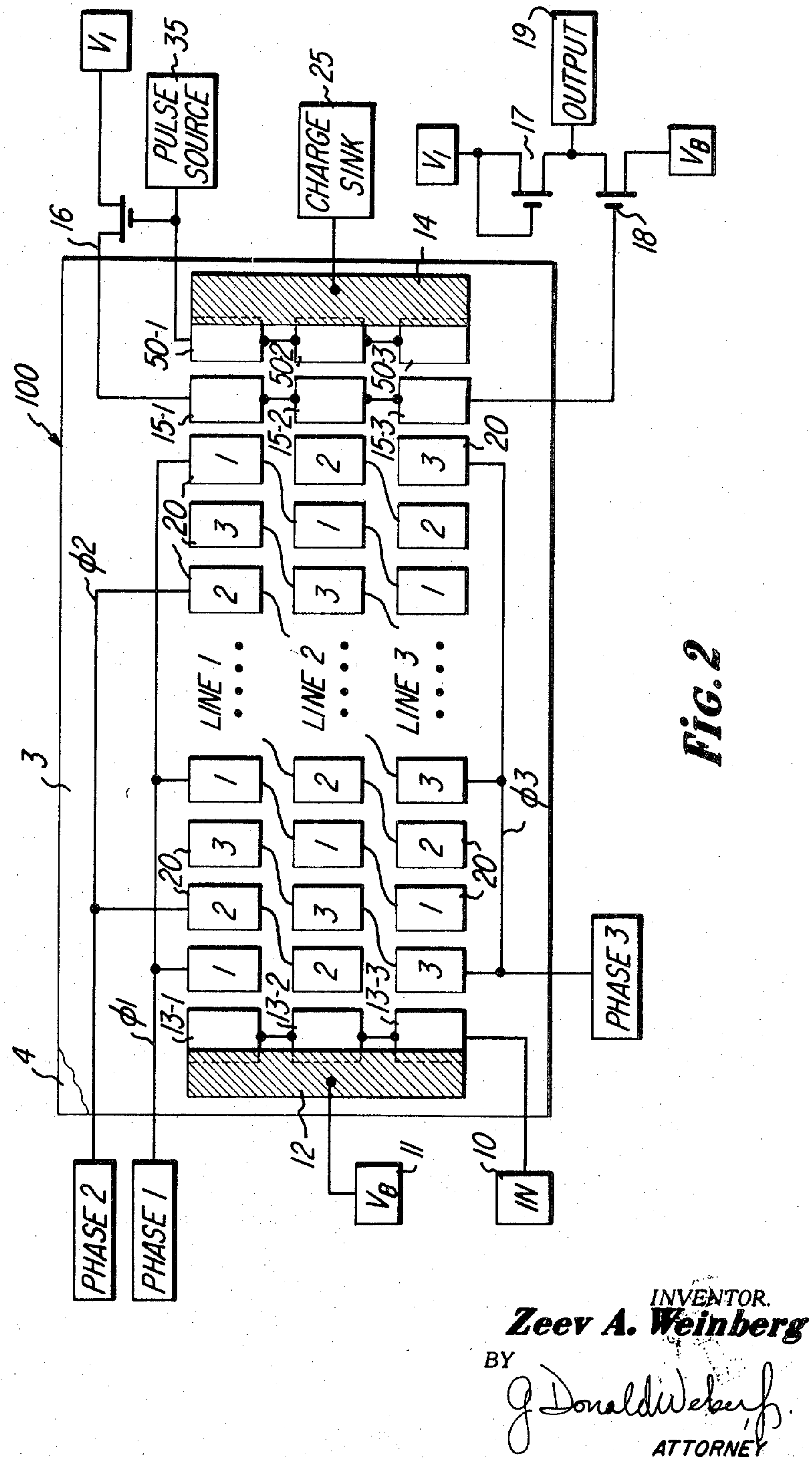
FIG. 2 is a schematic representation of one embodiment of the instant invention.

Referring now to FIG. 2, there is shown a schematic, top-view representation of a preferred embodiment of the instant invention. Charge coupled device 100 includes a plurality of gate electrodes 20 arranged in lines and columns. In the illustrative representation herein, there are shown three lines and seven columns of gates. The gates are designated as 1, 2 or 3 which designation represents the phase relationships of the gates. In other words, each of the gates is connected to receive the phase signal according to the numerical designation. Furthermore, each line of electrodes has the initial gate thereof connected to a different phase such that in any column, each line is out-of-phase with the adjacent lines. This arrangement assures insertion of information into only one line at a time. Gate electrodes 20 are mounted on insulating layer 3 which is disposed on semiconductor body 4.

In addition, input electrodes 13 are provided. There is one input electrode (or electrode area) for each line of electrodes. The input electrodes 13–1 . . . 13–3 are connected together and may, in fact, be a common electrode. Digital information input source 10 is connected to the input electrodes to supply input signals thereto. Input source 10 supplies pulse signals which generate potential wells in substrate 4 such that charge from input stage 12 (charge source) can be injected into the system. The input signals supplied by source 10 are not phase-related but cab be N times as fast as the clock signals, where N is the number of phases (and electrode lines) used in the embodiment shown and described. Of course, other than three-phase systems are possible, wherein $N \geq 2$.

Likewise, a plurality of sense electrodes 15–N are provided with one electrode (or electrode area) for each line. These electrodes are connected together and may be a common electrode. The sense electrodes are connected to a suitable sensing apparatus including amplifiers 16, 17 and 18 and described hereinafter.

A plurality of buffer electrodes 50–N are provided with one electrode (or electrode area) for each electrode line. In the embodiment shown in FIG. 2, electrodes 50–1 . . . 50–3 are connected together. This common electrode is connected to a suitable source 35 for selectively pulsing the buffer electrodes in order to transfer charge stored thereat to output stage 14 (charge sink). In the case of the input, output and sense electrodes, discrete areas are shown in order to provide discrete potential wells associated therewith. However, such discrete areas are not required. In addition, input stage 12 and output stage 14 are generally diffused areas of opposite conductivity to substrate 4 and which act as a source and sink, respectively, of the minority carriers which are propagated in the lines.

Common input stage 12 is mounted adjacent to input electrodes 13–1 . . . 13–3. Input stage 12 is connected to source 11 which provides a bias voltage $V_B$. In fact, potential $V_B$ may be ground potential or any other suitable potential for maintaining the input stage in a condition for transferring charge to the input electrodes upon application of input signals without permitting charge coupling in the reverse direction. Thus, when an input signal is applied by source 10, charge is transferred to and stored in the potential wells associated with input electrodes 13–1 . . . 13–3. This condition may be defined as a binary 1 condition. The initial electrode in the electrode lines which receives the next TRANSFER signal (i.e., immediately after an input signal) from the phase or clock signals, transfers charge from the input electrode to the line electrode if the previous digital input was a binary 1. The charge is then transferred along the line as described infra. Obviously, if an input signal is not generated prior to a clock signal, zero charge is transferred along the line from the input stage. This condition may be defined as a binary 0 condition. Of course, the condition definitions may be reversed for some applications.

Common output stage 14 (i.e., charge sink) is mounted adjacent to buffer electrodes 50–1 . . . 50–3 to receive charge therefrom. The buffer electrodes are connected to source 35, which supplies periodic pulses. The pulses selectively control the potential wells at the buffer electrodes and, thus, the charge transfer thereby. Output stage 14 is connected to source 25 and may be a polysilicon area or the like. Source 25 is of any suitable potential to cause transferred charges to be removed from output stage 14. Moreover, the potential supplied by source 25 is related to the bias voltage $V_B$ to effect a charge balance in the device.

Output electrode 15–1 is connected to the drain electrode of MOS amplifier 16. The source electrode of amplifier 16 is connected to source $V_1$ which supplies a suitable potential to amplifier 16. The control electrode of amplifier 16 is connected to pulse source 35. Source 35 supplies periodic pulses to amplifier 16 to selectively cause conduction thereby. When amplifier 16 is conductive, electrodes 15–1, 15–2, 15–3 are connected to $V_1$ and driven such that deep depletion potential wells are produced and charge is stored therein from the adjacent line electrode. In addition, buffer electrodes 15–1 . . . 15–3 are energized such that no potential well (and, thus, no charge transfer) is produced therewith. When amplifier 16 is nonconductive (i.e., between pulses at the control electrode) the potential well associated with each buffer electrode is capable of receiving charge from the adjacent output electrodes. Thus, charge is transferred to output stage 14 via buffer electrodes 50–1 . . . 50–3. This arrangement is analogous to a capacitive device, as explained hereinafter.

Output electrode 15–3 is connected to the control electrode of MOS amplifier 18. The source electrode of amplifier 18 is connected to ground or other suitable reference potential. The drain electrode of amplifier 18 is connected to the source electrode of MOS amplifier 17 and to output 19. The control and drain electrodes of amplifier 17 are connected to source $V_1$ which supplies a suitable potential to the amplifier.

Amplifiers 17 and 18 are connected in a conventional inverter configuration and have the conduction paths thereof connected in series. Consequently, when a signal is supplied from output electrode 15–3 to the base of amplifier 18, representative signals are supplied to output 19. Since output electrodes 15–1 through 15–3 are connected together, a signal supplied (i.e., charge coupled) to any of these electrodes by any line electrode will be detected by the output circuitry. Essentially, the signal detected is a voltage change produced by the change in charge (Q) stored in the capacitance (C) of the capacitive device produced by the electrode, as noted supra. This operation is essentially defined by the equation $\Delta V = C/\Delta Q$, where $\Delta Q$ is the change effected when charge is transferred into the potential well adjacent electrodes 15–1 . . . 15–3.

Figure 3:
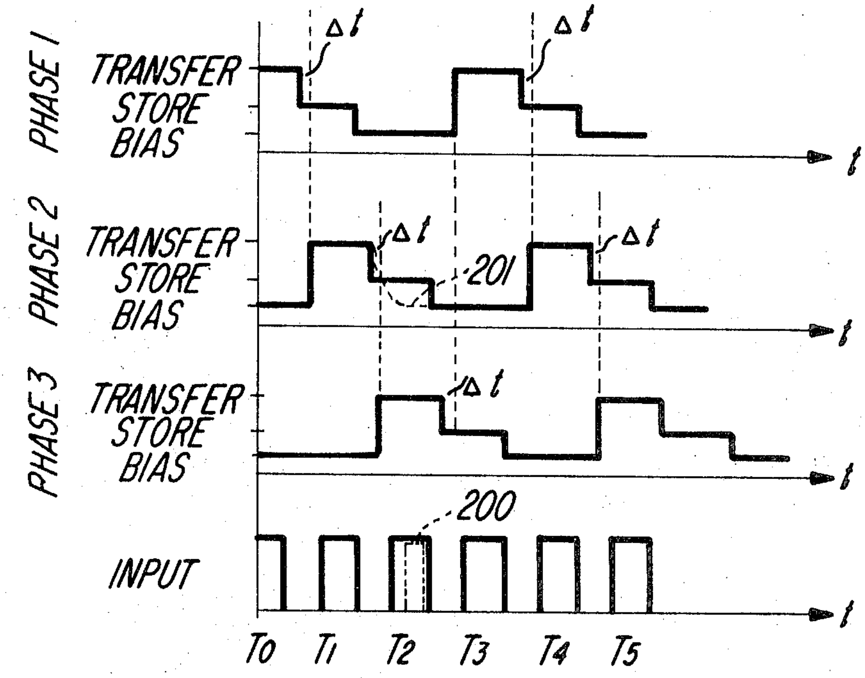
FIG. 3 is a timing diagram of signals applied to the device shown in FIG. 2.

Referring now to FIG. 3, there is shown a timing diagram of the input and phase signals applied to the system shown in FIG. 2. These signals include the phase 1, phase 2 and phase 3 signals which are applied to lines 1, 2 and 3, respectively. The input signal is applied to input electrodes 13–1 . . . 13–3 by input source 10. For illustrative purposes, each of the clock phase signals include three different levels, viz. TRANSFER, STORE and BIAS, of the idealized signal. Actually, the clock voltage waveforms may be of the form of essentially square pulses having a longer fall time than rise time. The signal levels follow and repeat the pattern or sequence suggested. However, the signal levels of each signal are out-of-phase with the signal levels of other signals. The phase relationships are such that a TRANSFER signal supplied by the phase 2 signal source follows a TRANSFER signal by the phase 1 source. Likewise, a TRANSFER signal supplied by the phase 3 source follows a TRANSFER signal by the phase 2 source and precedes a TRANSFER signal by the phase 1 source. This time relation of the phase signals causes operation of the electrode lines to follow sequentially in the same order.

The input signals from source 10 are supplied at a frequency which is three times the frequency of the clock signals because there are three electrode lines. That is, an input signal is supplied during each TRANSFER signal. In order to reduce synchronization problems, the input signal is defined to have a duration which is less than the duration of the TRANSFER signal portion of a phase signal. Thus, an input signal cannot be detected during more than one TRANSFER signal. In fact, by suitable circuitry (not shown) the input and TRANSFER signals can be initiated by the same pulse and the input signal delayed somewhat to insure prior application of the TRANSFER signal.

In addition, to insure that an information signal (i.e., charge) is not inadvertently propagated, the initiation of the TRANSFER signal of each phase or clock signal is delayed for a time $\Delta t$ until after the termination of the TRANSFER signal of the next preceding phase signal. Essentially, this relationship of the phase signals is important only as related to the application of an input signal. That is, if two or more TRANSFER signals were supplied concurrently (i.e., overlapping), an ambiguous condition would occur in view of the common input stage and electrodes. By delaying the leading edge of the subsequent TRANSFER signal until some finite time ($\Delta t$) after the trailing edge of the preceding TRANSFER signal, the possibility of this ambiguity and error is avoided.

Of course, if the operation dictates, the input signal may be made relatively narrow with respect to the TRANSFER signal and arranged to occur in the middle of the TRANSFER signal. This condition is suggested by the dotted line input signal 200 of FIG. 3. Moreover, the waveform 5A (see also FIG. 1) may be utilized for the clock signals. This waveform 201 is shown in dashed line in FIG. 3. With clock signals having waveform 201, it is apparent that only one input electrode receives a clock signal which is greater than the BIAS voltage when an input signal is applied. This operation also prevents ambiguous operation and error due to possible inappropriate operation of two input electrodes with a single input signal. Clearly, the combination of a narrow input signal, such as signal 200, and the modified clock signal, such as signal 201, is an optimum condition.

Figure 4:
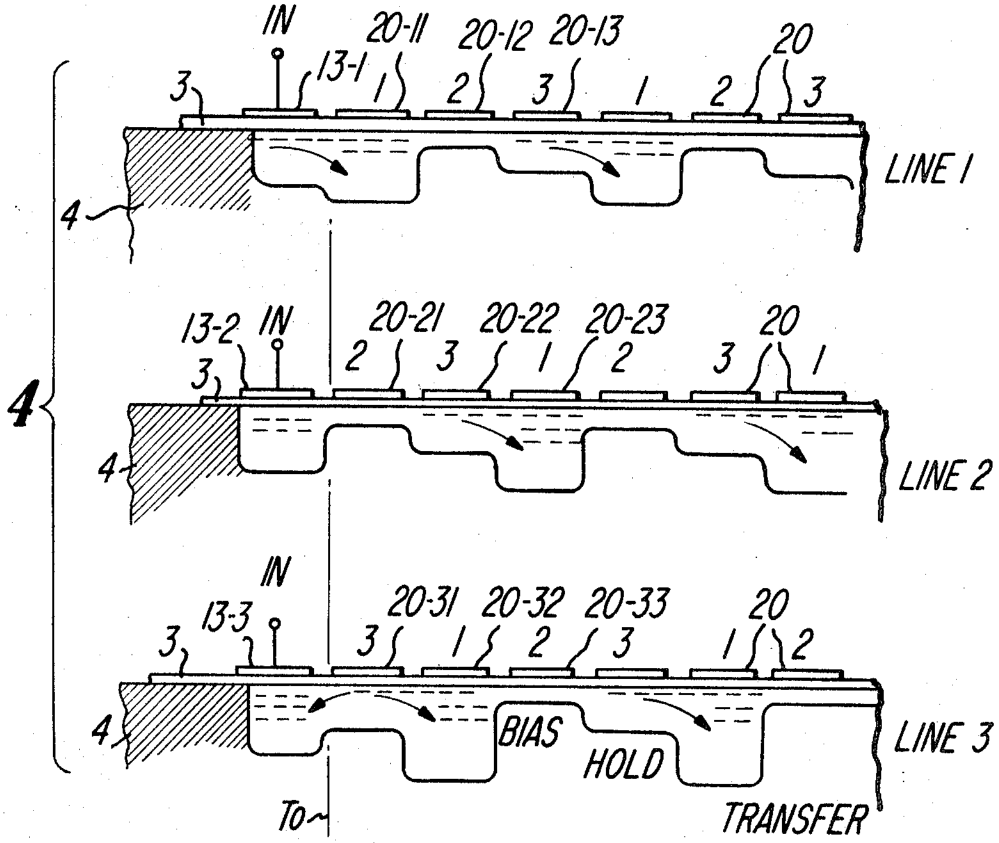
FIG. 4 is a graphic representation of the operation of the invention embodiment shown in FIG. 2.

Referring now to FIG. 4, there is shown a graphic and diagrammatic representation of the operation of the instant invention. FIG. 4 represents a cross-sectional side view of each of lines 1, 2 and 3 of the circuit shown in FIG. 2. Moreover, the view of FIG. 4 suggests the status of the potential wells and the charge in the semiconductor.

For convenience, FIGS. 2, 3 and 4 may be referred to concurrently. In FIG. 4, the individual conductors for supplying the phase signals are not shown and may be considered to be mounted (i.e. plated or the like) on the surface of the semiconductor. A time reference $T_0$ is shown in FIGS. 3 and 4. Thus, an input signal is supplied to input electrodes 13–1, 13–2 and 13–3 by input source 10 at time $T_0$. This signal causes charge to be produced under the input electrodes.

Simultaneously, a TRANSFER signal has been supplied to line 1 by the phase 1 signal. As a result, the charge injected by the input signal is transferred to the potential well associated with line electrode 20–11 (i.e., electrode 20 of line 1, column 1). That is, the potential well developed under this electrode by the TRANSFER signal has a depth (i.e., energy level) such that the charge is readily transferred thereto.

Conversely, electrode 20–21 in line 2 is connected to phase 2, and receives a BIAS voltage signal. The BIAS signal produces a potential well having a depth (i.e., energy level) such that the charge cannot be transferred thereto from the input stage.

The signal supplied by phase 3, to electrode 20–31 in line 3 is a STORE signal. (If waveform 201 is used, electrode 20–31 receives a signal which is nearly at the BIAS signal level.) The potential well developed thereby is not sufficient to cause easy transfer of charge from the input stage to the potential well at electrode 20–31. While this condition is not quite so severe as a BIAS signal condition to completely prohibit charge transfer, the charge transfer is to be minimized. Consequently, a small amount of leakage or "residual" charge may be transferred from the potential well of electrode 20–31 to the input stage, i.e. reverse charge transfer. However, the reverse charge condition is not usually a critical problem. In fact, the residual charge which may be reverse transferred is, effective, combined with any charge produced in the input stage and utilized thereby.

The possible effect of reverse transfer of charge is considered in making the determination of forward charge transfer requirements for the device and allowances made therefor. Moreover, the reverse charge transfer merely injects additional charge into the input stage charge signal until the input signal terminates. That is, the energy level relationship changes when the input signal terminates and reverse charge transfer no longer occurs. If this type of operation is unsatisfactory, input electrodes 13–1 . . . 13–3 can be separated into individual stages.

Furthermore, referring to FIGS. 3 and 4, it is seen that the phase signal format (i.e., BIAS voltage following TRANSFER voltage) prevents charge from propagating along the circuit in an uncontrolled manner. That is, electrode 20–12 of line 1 and connected to the phase 2 signal, has a BIAS voltage supplied thereto as does electrode 10–21 of line 2. Consequently, the charge which is transferred to the potential well at electrode 20–11 of line 1 is not transferred to electrode 20–21 of phase 2.

Similar operation of the circuit obtains throughout. Thus, charge is transferred to a potential well during a TRANSFER signal. The charge transfer is blocked by a BIAS voltage signal and stored in the presence of a STORE voltage signal. The stored charge is transferred by the next TRANSFER signal and so on.

In the circuit shown in FIG. 2, the INPUT signal is supplied to the three electrode lines concurrently. However, only one of the electrode lines is activated by the phase signal at any time. An electrode line is activated (for charge transfer) by a TRANSFER signal. Consequently, three input signals can be supplied and operated upon during each phase signal cycle. That is, each line during each cycle portion of the phase signals. Of course, due to the phase relationship of the phase signals only one line electrode is energized or activated at a time. When this electrode is activated, the charge under the input electrode is transferred to the line electrode. For example, at time $T_0$ the first line electrode is energized and charge from the input stage is transferred thereto. This charge is not transferred beyond electrode 20–11 because electrode 20–12 receives a BIAS voltage signal from the phase 2 source whereby an inverted energy level exists. Moreover, line electrodes 20–21 and 20–31 are not properly energized to permit input charge to be transferred thereto. A similar signal condition exists at time T3 and similar operation occurs.

At time T1, an input signal is supplied concurrent with the application of a TRANSFER signal to line electrode 20–21. Thus, charge is transferred from input electrode 13–2 to line electrode 20–21. The charge is not propagated further in line 2 since electrode 20–22 receives a BIAS voltage signal from the phase 3 source and an inverted energy level exists. Moreover, line electrode 20–11 receives a STORE signal from the phase 1 source and does not transfer charge from input electrode 13–1. Whether or not charge is transferred to line electrode 20–12 is dependent upon the signal waveform utilized (i.e., signal 5 or 5A), as discussed supra. This operation is repeated at time T4.

At time T2, the TRANSFER signal is supplied to electrode 20–31 by the phase 3 source. Thus charge is transferred to electrode 20–31 from the input electrode. This operation is similar to that described previously for other lines. The operation for the entire structure is repeated periodically as dictated by phase relationships.

Since, during each phase of the phase signal cycle, an input signal is received and operated upon by the circuit, a threefold speed-up is accomplished. Moreover, since the output signals are obtained in a similar manner, the signals are maintained in the same time relation.

Obviously, the manner of fabricating the described structure is not essential. That is, plating, deposition, etching and the like techniques are to be optimized but do not form part of this invention, per se. Moreover, certain changes will become apparent to those skilled in the art. For example, voltage levels or polarities may be reversed or the like. In addition, different materials may be utilized in preparing the instant circuit device and the specific waveforms may be altered for specific operating procedures. However, any changes of this nature are intended to be included within the scope of this invention.

What is claimed is:

1. In combination, a charge coupled device including a plurality of charge coupled gate devices arranged in an array having lines and columns, signal supplying means connected to said charge coupled gate devices to supply control signals thereto, said signal supplying means supplying signals having as many phases as there are lines in said array whereby the charge coupled gate devices in each line are energized at times different from the other charge coupled gate devices in each column, input means coupled to the lines of said array of charge coupled gate devices, and output means coupled to the lines of said array of charge coupled gate devices.

2. The combination recited in claim 1 wherein each of said charge coupled gate devices includes at least a conductor element and a semiconductor element separated by an insulating element, said conductor element connected to said signal supplying means, said signal supplying means providing signals having at least two different levels in each signal cycle, said signal supplying means supplying a different signal level to adjacent ones of said array of charge coupled gate devices at any time so that said adjacent charge coupled gate devices exhibit different characteristics.

3. The combination recited in claim 1 wherein each of said charge coupled gate devices includes an electrode connected to said signal supplying means, said signal supplying means supplying different signal levels in each signal cycle, said signal supplying means supplying a plurality of signals of different phase relationship, said array of charge coupled gate devices connected to said signal supplying means to receive signals in a predetermined phase relationship so that adjacent charge coupled gate devices in said array receives signals of different phase and different level.

4. The combination recited in claim 1 wherein said input means includes input signal supplying means, said input signal supplying means selectively supplying signals representative of input information to be provided to said array of charge coupled gate devices.

5. The combination recited in claim 4 wherein said input means includes at least one input charge coupled gate device adjacent to said array, said input charge coupled gate device connected to said input signal supplying means, and input stage means disposed adjacent to said input charge coupled gate devices to apply a reference signal thereto.

6. The combination recited in claim 1 wherein said output means includes at least one output charge coupled gate device adjacent to said array, pulse source means connected to said output charge coupled gate device to selectively supply a pulse thereto for producing output signals indicative of the condition of said array, and sensing means for sensing said output signals.

7. The combination recited in claim 2 wherein said charge coupled gate devices exhibit different characteristics relative to the ability to store charge in the semiconductor element thereof, said ability being a function of the characteristic of the adjacent charge coupled gate devices such that the ability to store charge is inversely proportional to the ability to transfer charge to the adjacent charge coupled devices, said array of charge coupled gate devices being arranged on a unitary semiconductor element such that charge is transferred within said unitary semiconductor element.

8. The combination recited in claim 6 including a buffer stage, output stage means and charge sink means, said buffer stage disposed between said output stage and said output charge coupled gate device adjacent to said array, said charge sink means coupled to said buffer stage to selectively receive charge therefrom.

* * * * *

UNITED STATES PATENT OFFICE
CERTIFICATE OF CORRECTION

Patent No. 3,656,011 Dated April 11, 1972

Inventor(s) Zeev Abraham Weinberg

It is certified that error appears in the above-identified patent and that said Letters Patent are hereby corrected as shown below:

In Column 2, line 40, "cab" should read ---can---; line 46, after "connected" delete ---Δ---. In Column 3, line 68, "include" should read ---includes---. In Column 5, line 13, "effective" should read ---effectively---; line 32, "10-21" should read ---20-21---; line 48, after "That is," insert ---a TRANSFER signal is supplied to the first electrode in---. In Column 6, line 60, "receives" should read ---receive---.

Signed and sealed this 21st day of November 1972.

(SEAL)
Attest:

EDWARD M.FLETCHER,JR.
Attesting Officer

ROBERT GOTTSCHALK
Commissioner of Patents

ORM PO-1050 (10-69)
530 6|72

USCOMM-DC 60376-P69
U.S. GOVERNMENT PRINTING OFFICE 1969 O-366-334